US008996987B2

(12) United States Patent
Rivera et al.

(10) Patent No.: US 8,996,987 B2
(45) Date of Patent: Mar. 31, 2015

(54) LIST VIEW OPTIMIZATION

(75) Inventors: Mitchell B. Rivera, San Francisco, CA (US); Alex Iskander, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 650 days.

(21) Appl. No.: 13/174,323

(22) Filed: Jun. 30, 2011

(65) Prior Publication Data

US 2013/0007590 A1 Jan. 3, 2013

(51) Int. Cl.
*G06F 3/048* (2013.01)
*G06F 3/0481* (2013.01)

(52) U.S. Cl.
CPC .................................... *G06F 3/0481* (2013.01)
USPC ............................ 715/234; 715/830; 345/548

(58) Field of Classification Search
CPC .................... G06F 17/30902; G06F 17/30905; G06F 17/30132
USPC ...................... 715/234, 830, 784; 707/E17.12
See application file for complete search history.

(56) References Cited

U.S. PATENT DOCUMENTS

| 6,959,425 | B1* | 10/2005 | Krauklis .................... 715/864 |
| 7,417,646 | B1* | 8/2008 | Larsen ...................... 345/619 |
| 7,786,975 | B2 | 8/2010 | Ording et al. |
| 2002/0008699 | A1* | 1/2002 | Jou et al. .................... 345/421 |
| 2003/0088580 | A1* | 5/2003 | Desai et al. ............... 707/104.1 |
| 2005/0060498 | A1* | 3/2005 | Curtis ......................... 711/134 |
| 2005/0071777 | A1* | 3/2005 | Roessler et al. ............. 715/810 |
| 2005/0110804 | A1* | 5/2005 | Hancock et al. ............. 345/640 |
| 2006/0022985 | A1* | 2/2006 | Shepherd et al. ............. 345/535 |
| 2006/0209690 | A1* | 9/2006 | Brooke ......................... 370/230 |
| 2007/0060359 | A1* | 3/2007 | Smith ............................ 463/42 |
| 2008/0134079 | A1* | 6/2008 | Brunner et al. ............... 715/784 |
| 2008/0301734 | A1* | 12/2008 | Goldeen et al. ................ 725/44 |
| 2009/0106687 | A1* | 4/2009 | De Souza Sana et al. ..... 715/784 |
| 2010/0082353 | A1* | 4/2010 | Larson et al. .................... 705/1 |
| 2010/0162126 | A1* | 6/2010 | Donaldson et al. ........... 715/738 |
| 2011/0087957 | A1* | 4/2011 | Dumitru et al. ............... 715/234 |
| 2011/0093790 | A1* | 4/2011 | Maczuba ...................... 715/745 |
| 2012/0062576 | A1* | 3/2012 | Rosenthal et al. ............ 345/522 |

(Continued)

OTHER PUBLICATIONS

"Google Reader Gets a Facelift" dated Feb. 28, 2006 (1 page); downloaded from the Internet http://www.zdnet.com/blog/google/google-reader-gets-a-facelift/341.

*Primary Examiner* — Stephen Hong
*Assistant Examiner* — Ahamed I Nazar
(74) *Attorney, Agent, or Firm* — Blakely, Sokoloff, Taylor & Zafman LLP

(57) ABSTRACT

Techniques are provided for optimizing operations, such as scrolling, that move rendered views for items in a collection relative to a viewable window. An application initially renders only those views within the viewable window. In a background process, the application also builds a pool of rendered views that are outside of the viewable window. Background rendering occurs is timed to not interfere with the user's experience. The pool is constrained in size so as not to over-utilize device memory. When a new item is scrolled or otherwise moved into the viewable window, the application first checks the pool to determine if a view of the new item is already rendered. If so, the application simply displays the pre-rendered view, resulting in minimal processor utilization. The application thus provides the user with a "smoother" scrolling experience. A priority queue for identifying views to replace or overwrite is also discussed.

30 Claims, 9 Drawing Sheets

(56) References Cited

U.S. PATENT DOCUMENTS

| | | | |
|---|---|---|---|
| 2012/0158752 A1* | 6/2012 | Chakka | 707/752 |
| 2012/0159393 A1* | 6/2012 | Sethi | 715/830 |
| 2012/0198319 A1* | 8/2012 | Agnoli et al. | 715/202 |
| 2012/0207449 A1* | 8/2012 | Angquist et al. | 386/278 |
| 2012/0254822 A1* | 10/2012 | Lin et al. | 717/101 |
| 2012/0260157 A1* | 10/2012 | Zhu et al. | 715/234 |
| 2012/0271920 A1* | 10/2012 | Isaksson | 709/219 |
| 2012/0284664 A1* | 11/2012 | Zhao | 715/784 |

* cited by examiner

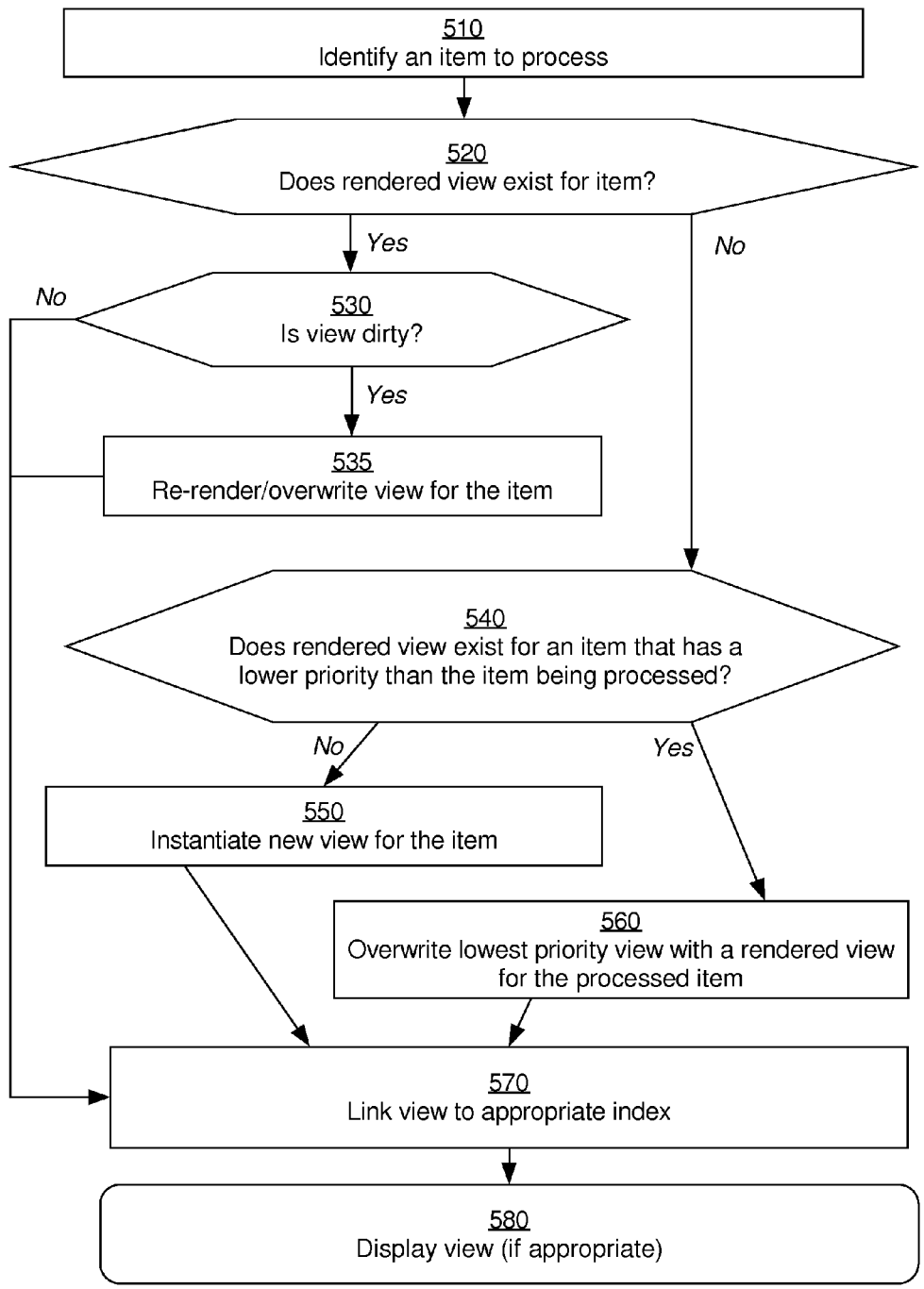

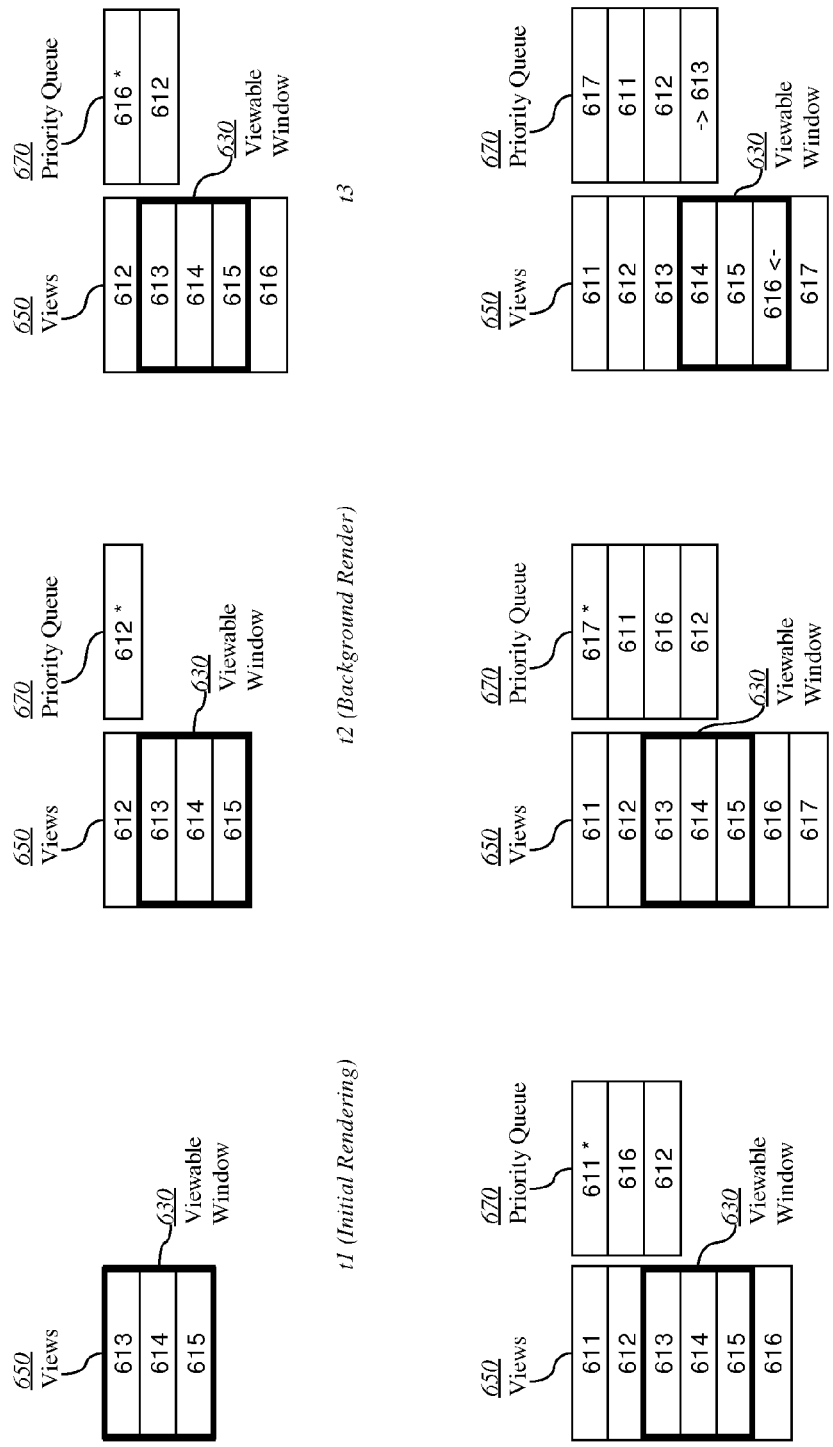

LIST VIEW OPTIMIZATION

TECHNICAL FIELD

Embodiments relate generally to displaying collections of items, and, more specifically, to techniques for optimizing displays where only a subset of the collection is viewable at any given time.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Information based on or derived from a set of related data items are commonly presented to users as a collection of views. For example, information about an individual contact, email, or search hit may be displayed as an individual element, or "view," in a scrollable list of contacts, emails, or search hits. The information inside each data item is used to generate, or "render," a displayable view based on the data item. For example, information about a contact may be rendered as one or more Hyper-text Markup Language ("HTML") elements in a web application.

Rendering views for collections of items can be a resource-intensive process. This is true both from the perspective of the amount of memory necessary to store the rendered views in comparison to the amount of memory necessary to store views of items, and from the perspective of processor utilization during the rendering. For example, at the time of writing, interaction with the Document Object Model ("DOM") to generate HTML elements is notoriously expensive from both memory and processor perspectives. Naturally, the amount of resource usage necessary to render an entire collection of views grows in proportion to the size of the collection.

One technique for dealing with various complications arising from the high resource utilization involved in rendering collections of items is to render views, when possible, at the client responsible for displaying the view as opposed to a server. This technique helps confront potentially incapacitating issues such as delays stemming from latency between the client and the server, and/or constraints on bandwidth between the client and the server. However, the technique does nothing to address the issue of memory limitations at the client. This technique also shifts processor utilization to the client, where, depending on the natures of the client application and the client device, the detrimental effects of higher processor utilization may include decreased battery life and/or perceivable, albeit typically less pronounced, delays or "jerkiness" while the client renders the views.

Another technique for dealing with various complications arising from the high resource utilization involved in rendering collections of items is to only render views that are positioned within the viewable window of an arrangement. An application determines when an operation modifies the views that are within a viewable window. The application determines which views are no longer within the viewable window and deletes them. The application also determines which items should now have views in the viewable window, and renders views for any items that were not displayed prior to the operation. In this manner, the application is able to permanently decrease memory utilization. However, this benefit comes with the requirement of higher processor utilization during even short-distance scrolling operations. Higher processor utilization during operations that modify the viewable window is often undesirable. For example, in devices such as mobile phones, bursts of higher processor utilization as the user scrolls through a list negatively affect the "smoothness" of the operation, as perceived by the user.

BRIEF DESCRIPTION OF THE DRAWINGS

In the drawings:

FIG. 5 is a flow diagram illustrating a method that employs view overwriting;

FIG. 6A and FIG. 6B are time graphs illustrating changes to a view pool and a priority queue with respect to a viewable window over time in response to scrolling operations;

DETAILED DESCRIPTION

Figure 1:
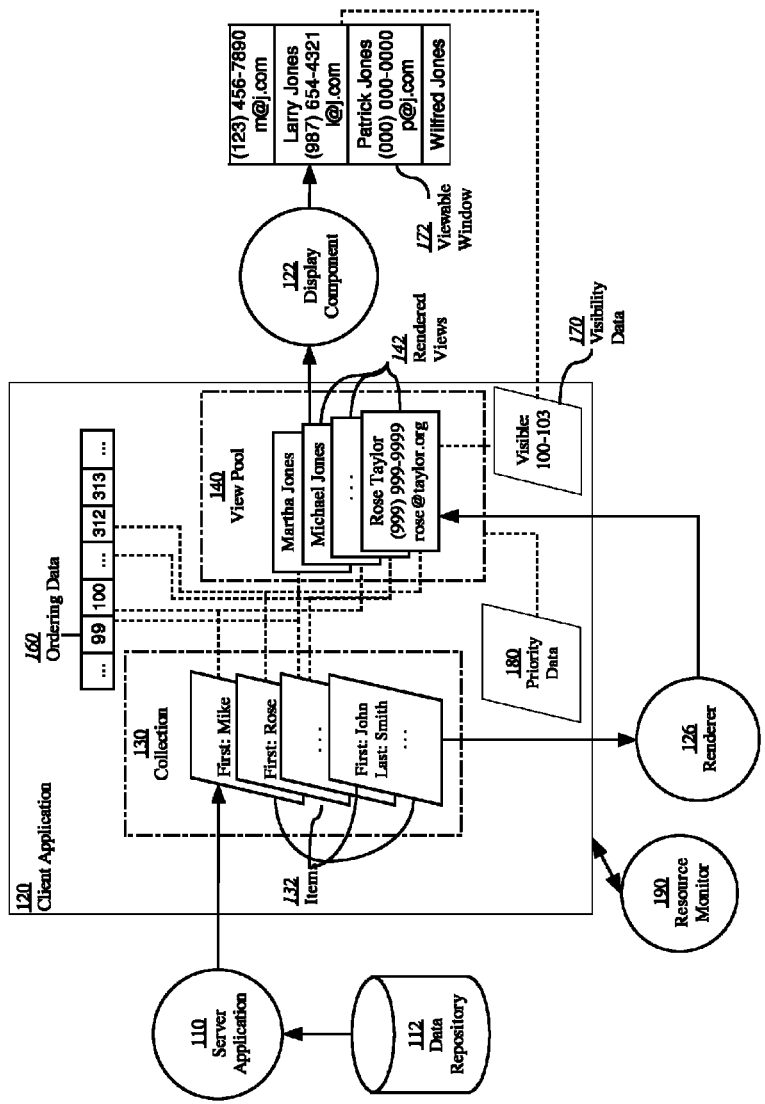
FIG. 1 is a block diagram of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Definitions
        2.1. Items
        2.2. Rendering Views
        2.3. Displaying Collections of Items
    3.0. Structural Overview
        3.2. Example JavaScript-Based System
    4.0. Functional Overview
        4.1. Selecting the Additional Items to Background Render
        4.2. Resuming Background Rendering after Viewable Window Moves
        4.3. Dealing with View Pool Size Constraints
        4.4. Optimizing Operations by Overwriting views
        4.5. Priority queue
        4.6. Item Updating
    5.0. Implementation Examples
        5.1. Example Scrolling Operation
        5.2. Example Filtering Operation
        5.3. Alternative Priority Queue
    6.0. Implementation Mechanism—Hardware Overview
    7.0. Extensions and Alternatives 1.0. General Overview Approaches, techniques, and mechanisms are disclosed for optimizing operations, such as scrolling, that move rendered views for items in a collection into or out of a viewable window. An application initially renders only those views within the viewable window. However, in a background process, the application also builds a pool of rendered views that are outside of the viewable window. The background rendering is configured to occur only when rendering will not interfere with the user's experience, such as when a processor is idling or when resource utilization is below a certain threshold. The pool may be constrained in size so as not to overutilize device memory. When a new item is scrolled or otherwise moved into the viewable window, the application first checks the pool of rendered views to determine if a view of the new item is already rendered. If so, the application simply displays the pre-rendered view, resulting in minimal processor utilization. The application is thus able to provide the user with a relatively "smooth" scrolling experience for operations involving pre-rendered views. Otherwise, the application renders a view for the new item and displays the newly rendered view as normal.

In an embodiment, the application intelligently builds and maintains the pool so as to ensure that the views most likely to be scrolled into the viewable window are already generated. For example, in an embodiment, the application builds the pool based at least in part on a calculated distance between the item's view and the position of the viewable window within the arrangement of views. In so doing, among other effects, the application ensures that small movements in the viewable window occur with minimal processor utilization.

In an embodiment, the application further maintains a prioritized queue of the already rendered views, so as to be able to quickly identify rendered views that should be deleted in the event that the pool grows too large. In an embodiment, the application may select to overwrite a lesser priority rendered view as opposed to instantiating a new view while scrolling, or when the pool has reached its maximum size. The application may do so to take advantage of the fact that certain renderers require lower resource utilization for overwriting versus instantiation. For example, it is often easier to rewrite the contents of an HTML element using the DOM than it is instantiate an entirely new HTML element. In such embodiments, the priority queue may thus also be utilized to quickly identify the lowest priority rendered view.

In an embodiment, each item is an object configured to semi-autonomously receive updates and re-render its view accordingly. To avoid unnecessary processor utilization and/or interference with maintenance of the pool of rendered views, the item is configured to invoke a re-rendering function only if the view for the item is currently visible, or when a controlling object indicates that the item is permitted to do so.

In other aspects, embodiments encompass a computer apparatus and a computer-readable medium configured to carry out the foregoing steps.

2.0. Definitions 2.1. Items

As used herein, an item is a structure that includes data or other information. The information within an item may represent a wide variety of real or abstract things, including persons (such as a contact in a contact list), emails, merchandise, places, search results, and so forth. Examples of an item include, without limitation, JavaScript objects, other coded objects, rows or other components of database tables, database tables themselves, data tuples, parameterized vectors, eXtended Markup Language ("XML") elements, and so on. Items may be stored directly within databases or structured data files. Items may also or instead be generated from data stored in databases through the use of queries, transforms, functions, and so forth.

Many software and/or hardware components—herein generically referred to as "applications" for the purpose of readability—are designed to retrieve, receive, interpret, process and/or display information about an item. As part of displaying information about an item, an application may render a view. A view of an item defines a particular display of textual information and/or graphics based on the information within the item. A view may take a variety of forms. For example, a view may include a set of instructions to a targeted display component, such as a web browser, operating system, or graphics pipeline. The instructions instruct the display component to generate a display for the corresponding item. A view may also or instead include an object that is linked to the item. A view may include additional elements, such as ancillary data and functions that facilitate manipulation of the display.

2.2. Rendering Views

The act of rendering a view of an item refers to an application generating the instructions that cause a display component to display or "paint" the textual information and/or graphics. Thus, a view for which appropriate instructions have been generated is said to have been rendered. Rendering is performed based on the information within the item. However, the instructions generated as a result of the rendering process invoke display logic at the display component without requiring the display component to be logically aware of the items themselves. Higher-level software applications typically accomplish the act of rendering with the assistance of a specialized rendering component, hereinafter known as a "renderer." After any necessary preliminary processing of the information within an item, an application sends instructions to the renderer via a suitable interface, such as an application programming interface (API). The renderer then generates the rendered view in response to the instructions from the application. However, an application may instead act as its own renderer, or even rely upon a renderer for generating only certain aspects of the rendered view.

For example, within the context of web development, the act of rendering may refer to the process of generating any HTML elements necessary to instruct a browser or other client to display information about the item. Such a process may occur, for example, in response to a JavaScript application of a web page sending instructions that cause a DOM—in this case the renderer—to generate the HTML elements. Such a process may instead occur as a result of a server-based application issuing similar instructions to a DOM.

As another example, within the context of generic "desktop" software applications, the act of rendering may refer to a software application issuing instructions that cause a graphics pipeline to generate lower-level graphical representations of various interface elements, such as bitmaps or vectors. Or, as yet another example, the act of rendering may refer to a software application issuing instructions that cause a more intermediate component, such as a library of GUI functions and routines, to generate intermediate objects or representations that can in turn issue instructions to the graphics pipeline as needed.

2.3. Displaying Collections of Items

Items are often displayed together in an arrangement with other similar items as part of a collection. The collection may be arranged in a variety of ways, including, without limitation, a list, table, grid, or tree. Each item in the collection is depicted as an element within the arrangement. For example, an item may be represented as an element of a list, a cell of a grid, a row of a table, node of a tree, and so forth.

Arrangements of larger collections often cannot be displayed within an intended viewing area. Examples of an intended viewing area include, without limitation, a computer monitor, a screen of a cell phone, an extended "desktop" covering multiple screens, a window within a computer screen, a field or other division of a window, or a frame or pane of a web page. To accommodate the display of a collection within an intended viewing area, one may limit the portion of that arrangement that is actually displayed in the intended viewing area to a viewable window. The user then requests performance of operations collectively referred to herein as "scrolling operations" to see other portions of the arrangement. In response to a scrolling operation, the application "moves" the viewable window. Or, stated another way, the application moves and/or changes the views displayed within the viewable window. With certain arrangements, such as grids, scrolling may also cause adjustments to the arrangement, such as rearranging the grid so that the view of a particular item is centered in the viewable window.

An application may further provide a variety of other operations to assist the user in finding a view for a particular item of interest. One such operation is to permit the user to "jump to" a subdivision of the collection. For example, an "address book" application may permit a user to jump directly to views of contacts whose last names start with a particular letter. Another such operation is to permit the user to filter the collection, so that only items having certain characteristic(s) are displayed within the arrangement. For example, an "address book" application may permit a user to filter the collection by user-tagged categories, such as "Family" or "Office." Many other types of operations that modify the views shown in the viewable window are also possible. As yet another example, a server may periodically update items, resulting in a client application re-ordering, moving, adding, and/or re-rendering views within an arrangement.

3.0. Structural Overview

FIG. 1 is a block diagram of an example system 100 in which the techniques described herein may be practiced, according to an embodiment.

Server

A server application 110 retrieves data from a data repository 112. Server application 110 may be any application implemented at one or more server devices, such as, for example, a web application. Data repository 112 may be, for example, a database system or file repository. Server application 110 retrieves the data from data repository 112 using any suitable mechanism, such as by making queries to a database server or reading files or data blocks from a storage device. Server application 110 and data repository 112 may be implemented by any combination of software and hardware at one or more server computing devices functioning as a system. For convenience, server application 110 may be referred to herein as a server, and the term server should be understood as potentially involving any number of computing devices and components thereof.

Server application 110 communicates a collection 130 of items 132 to a client application 120. Each of items 132, in an embodiment, is a data structure or object that includes data value(s) for at least one or more related fields. The data values may include, without limitation, text, numbers, images, video, audio, and so on. In an embodiment, each of items 132 in collection 130 adheres to a common data structure, and represents a similar type of item. For example, each item 132 may store data related to a different contact. Items 132 grouped in collection 130 share at least one common characteristic. For example, each item 132 may share similar values for one or more data fields, or may correspond to a similar geographic area. The common characteristic in some cases may not necessarily be explicit from the data within items 132 themselves. For example, each of items 132 may have been created by or for a particular user, or associated with similar attributes in data repository 112.

Server application 110 may retrieve items 132 from data repository 112. Server application 110 may also or instead generate items 132 by processing data from data repository 112. Server application 110 may also or instead communicate items 132 to client application 120 by sending instructions to client application 120 that cause client application 120 to create items 132. Server application 110 may communicate with client application 120 via any suitable mechanism, such as via a network and/or communication ports or sockets, using any suitable protocol, including, but not limited to, HTTP and HTTPS.

Client

Client application 120 may be implemented by any combination of software and/or hardware at a client computing device. The client computing device is typically, but not necessarily always, physically distinct from the one or more server computing devices. For example, client application 120 may execute on a personal computer, tablet, or mobile phone. Client application 120 is capable of causing the client computing device to output information, including graphics and text, by sending instructions to a display component 122. Client application 120 may be any application implemented by a client device, such as, for example, a desktop application or mobile application. Display component 122 may be, for example, a graphics display library. In an embodiment, client application 120 and display component 122 are logically distinct modules of a larger application, such as a web browser.

Views

Client application 120 processes items 132 and renders views 142 based thereon. Views 142 are data structures, objects, and/or sets of instructions that define a visual display. The visual display for a particular item 132 will vary depending on the information within the particular item 132. Each visual display may present textual or graphical data that is stored in an item 132, such as the name of an item 132 or pictures of an item 132. The item 132 may also or instead be used to calculate parameters of the visual display, such as colors or sizes.

Views 142 collectively form a view pool 140, which client application 120 may limit in size as necessary. For example, view pool 140 may be limited to a particular number of views 142, or a total amount of memory. Views 142 may therefore be deleted as necessary to maintain the size of the view pool 140. The maximum size need not necessarily be fixed—rather, the maximum view pool size may fluctuate in response to changes in memory utilization at the client device. Views 142 in view pool 140 may also be re-rendered from time to time in response to changes to a corresponding item 132.

Client application 120 may render views 142 by interfacing with a renderer 126. Renderer 126 renders views 142 in response to the command(s) from client application 120 by building the instructions necessary for display component 122 to output the visual display for an item. Renderer 126 may be logically distinct from client application 120 and display component 122. Alternatively, client application 120 and/or display component 122 may provide the functionality of renderer 126. In an embodiment, client application 120 may cause display component 122 to display a view 142, once rendered, by sending an explicit command to the display component 122 that indicates to display component 122 where the view 142 should be displayed. In an embodiment, such a command may be an implicit part of the rendering process.

Ordering Data

Client application 120 generates and maintains ordering data 160 to organize views 142 within an arrangement. For example, ordering data 160 may define a sequence for views 142 in a list 150. Client application 120 calculates ordering data 160 based on various characteristics of items 132 and/or user input. For example, ordering data 160 may arrange views 142 in a sequence based on an alphabetical ordering of values for a selected field within corresponding items 132. Ordering data 160 may be, for example, an indexed array of pointers to views 142 and corresponding items 132. Ordering data 160 may further include "empty slots" or pointers to placeholder views for items 132 that do not have a rendered view 142.

Client application 120 may continually update ordering data 160 in response to events that modify which items are represented in the arrangement of views 142, including user input such as filtering operations and sorting operations, as well as server updates to collection 130. Various embodiments call for views 142 to be overwritten with rendering instructions for different items. In such instances, ordering data 160 may also be updated to reflect a new index for the overwritten view.

Viewable Window

Client application 120 further maintains visibility data 170 that indicates which of views 142 appear in viewable window 172. Visibility data 170 may take a variety of forms, such as a specification of a range of indexes in ordering data 160, an enumerated list of identifiers for visible views 142, or flags directly associated with views 142. In an embodiment, client application 120 may determine visibility data 170 by making inquiries to display component 122 and/or calculations based on positional data known to client application 120. Visibility data 170 may be updated in response to operations that change which views 142 are displayed in the viewable window 172.

Client application 120 receives and responds to input data indicating input from a user, such as a request to scroll the viewable window or to filter items 132. Input data 142 is forwarded to client application 120 by any suitable component at the client device. In an embodiment, client application 120 may move the viewable window 172 in response to the input data. In an embodiment, the input data indicates to client application 120 that the viewable window 162 has been moved by, for example, the display component in response to user input. Client application 120 then makes a variety of determinations in response to the input data, such as whether to instruct display component 120 to display new rendered views 142, whether to instruct display component 120 to change the position of already visible views 142, whether to overwrite any views 142, and whether to render or delete views 142 from the view pool 140.

Priority Queue

Client application 120 further maintains priority data 180 that at least indicates one or more lowest priority views 142 that may be quickly removed or overwritten if necessary. Priority data 180 may be, for example, a linked list of view identifiers, pointers, or even views 142 themselves. In an embodiment, priority data 180 is a doubly linked list. As another example, priority data may be an identifier of the lowest priority view 142. Client application 120 updates priority data 180 after adding or removing views. Client application 120 may also update priority data 180 in response to operations that alter which views are visible in viewable window 172.

Resource Monitoring

Client application 120 further includes or interfaces with a resource monitoring component 190. Client application 120 uses data received from resource monitoring component 190 to determine when client application 120 may background render views 142 with minimal impact on the user's experience with the client device at which client application 120 is implemented. Resource monitoring component 190 may, for example, indicate processor or memory utilization. Resource monitoring component 190 may also or instead indicate whether client application 120 and/or the client device has executed any higher priority tasks, such as responding to real-time input, during a previous amount of time or a previous number of processor cycles.

Miscellaneous

In an embodiment, server application 110 is in continual or periodic communication with client application 120, so that server 110 may send updates regarding items 132. A view 142 may therefore be considered dirty if it was rendered at a time when the item 132 based upon which the view 142 was rendered had different data. To this end, each view 142 and/or its corresponding item 132 may also be associated with a flag indicating whether the view 142 is dirty, so that client application 120 knows to re-render the view 142 for the item 132 when possible.

System 100 is but one example of a system in which the techniques described herein may be practiced. Other systems may include additional or fewer components, in potentially different arrangements. For example, other systems may omit such components as a server 110 or renderer 126. As another example, priority data 180 may not be necessary in various embodiments. As another example, server application 110 may be responsible for rendering views, which are then relayed without modification to display component 122. These and other modifications are within the scope of the invention.

3.2. Example Javascript-Based System

Figure 2:
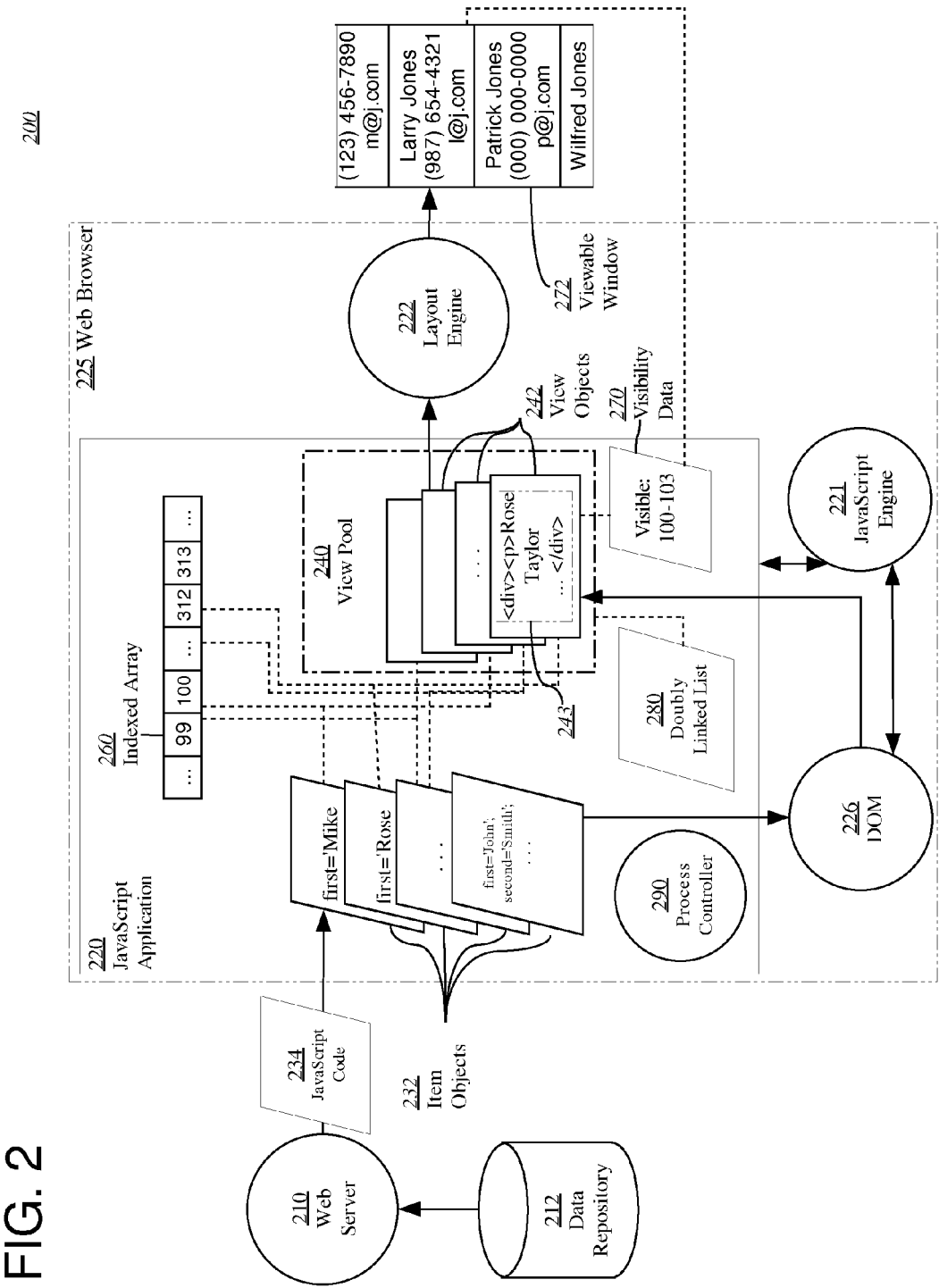
FIG. 2 is an example JavaScript-based system in which the techniques described herein may be practiced.

FIG. 2 is an example JavaScript-based system 200 in which the techniques described herein may be practiced. JavaScript-based system 200 illustrates a specific embodiment of system 100, and is thus similar thereto in many respects. However, system 200 is but one example of many possible systems that utilizes JavaScript-based components to practice the techniques describe herein. Other such systems may include additional or fewer components, in potentially different arrangements.

A web server 210 retrieves data from a data repository 212. Based on the retrieved data, the web server 210 generates JavaScript code 234 configured to instantiate JavaScript object-based items 232. The web server 210 sends the JavaScript code 234 to a web browser 225, which interprets and/or executes the JavaScript code 234 as part of the execution of a JavaScript application 220 by a JavaScript engine 221 of browser 225. The JavaScript code 234 may further have included the code of JavaScript application 220, or the code for JavaScript application 220 may have been communicated to the web browser 225 separately. In an embodiment, both JavaScript code 234 and the code for JavaScript application 220 was inserted into or referenced by a web page from web server 210.

The JavaScript application 220 generates JavaScript view objects 242 in a view pool 240. As part of generating view objects 242, the JavaScript application 220 renders the items 232 by making calls to a DOM 226. JavaScript view objects 242 include HTML elements 243 generated by DOM 226 in response to the calls from JavaScript application 220. JavaScript application 220 may, as necessary, instruct DOM 226 to insert, remove, move, or overwrite HTML elements 243 to a viewable window 272. DOM 226 in turn communicates with a layout engine 222 of browser 225, such as WebKit, to cause layout engine 222 to display the rendered HTML elements in viewable window 272.

JavaScript application 220 receives notification of events such as user input via DOM 226. JavaScript application 220 further interfaces with DOM 226 to maintain and update visibility data 270 about viewable window 272. JavaScript application 220 further maintains an indexed array 260 to provide ordering data for view objects 242. JavaScript application 220 further maintains a doubly linked list 280 of pointers to views 242, so as to provide priority data.

JavaScript application 220 further includes a process control component 290. Process control component 290 executes a critical runloop routine invoked by JavaScript engine 221 at predefined intervals and/or in response to various events. The critical runloop routine, in turn, invokes critical operations that have been designated for performance in real-time or near real-time, such as updating any views that are or should be displayed. Among other tasks, the critical runloop routine responds to recent user operations and updates any views whose data has recently changed. Upon completion of the critical runloop routine, the process control component 290 may set a timer to wake up again in a certain amount of time (e.g. 100 ms). If the critical runloop routine has not been invoked again during that period of time, process control component 290 may indicate to JavaScript application 220 that resource usage is sufficiently low to permit background tasks such as a background rendering cycle. The background tasks may be invoked by process control component 290, or by any other component of JavaScript application 220. Performance of background tasks may be limited to a certain period of time, such as a predefined number of milliseconds and/or until the next critical runloop routine is invoked, so as not to interfere with critical operations.

4.0. Functional Overview

Figure 3:
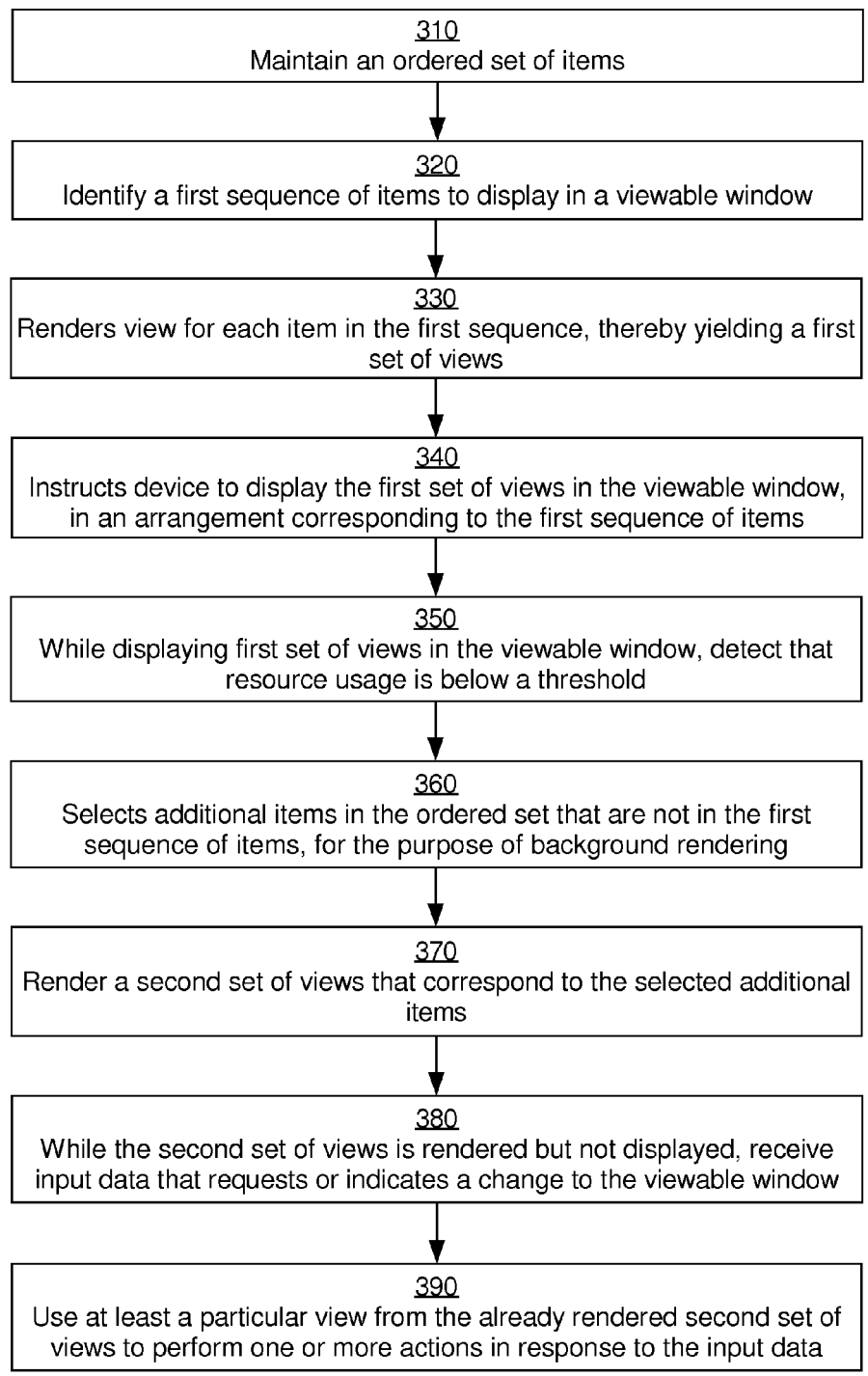
FIG. 3 depicts a flow diagram illustrating a method for optimizing operations that modify views visible in a viewable window.

FIG. 3 depicts a flow diagram 300 illustrating a method for optimizing operations that modify views visible in a viewable window, according to an embodiment.

At block 310, an application such as client application 110 maintains an ordered set of items, such as at least a subset of collection 130 organized by ordering data 160. For example, the application may maintain a set of objects containing contact information for various contacts. The application may order the contacts alphabetically.

At block 320, the application identifies a first sequence of items to display in a viewable window. For example, the application may identify the first n items that will fit in the viewable window, starting with the item at index 1 in the ordered set. Or, if the application has already scrolled or jumped to an item at a particular index past index 1, the application may identify the first n items starting with the particular index. The application may select the number n of items to include in the sequence using various techniques depending on the nature of the items and their respective views. For example, if the items are displayed in a vertically scrolling list, and if the vertical size of each view is known and fixed up front, the application may calculate the number n by dividing the vertical size of the viewable window by the vertical view size. If the size of a view is variable, the application may perform such a calculation based on estimates of the view size. In an embodiment, this step is performed in coordination with the rendering of views in block 330 below so that the application can determine the size of each rendered view. After each rendering, the application determines whether it has rendered enough views to fill the viewable window, and thus identified the number n of items in the first sequence.

At block 330, the application renders views, such as views 142, for each item in the first sequence, thereby yielding a first set of views. Rendering includes generating instructions to a display component, such as component 122, for creating visual displays of information extracted or derived from each of the items in the first sequence. The application may accomplish the rendering, for example, by interfacing with a renderer such as renderer 126.

At block 340, the application instructs the device at which the application is executing to display the first set of views in the viewable window, in an arrangement corresponding to the first sequence of items. For example, the application may instruct the device to display the views in a list ordered from top to bottom in a sequence corresponding to the first sequence of items, or the application may instruct the device to display a grid of the views, also in a sequence corresponding to the first sequence. The application instructs the device to display the views by sending instruction(s) to the display component. Depending on which of the application component and the display component are responsible for scrolling the viewable window, the instruction(s) to the display component may also include actual coordinates on the viewable screen at which to place a view.

In an embodiment, the application may send the instruction(s) to display a view separate from rendering the view. For example, if the application were a JavaScript application, the application may have generated HTML via a createElement (or similar) command in block 330, and may then instruct the browser to display the view by an appendChild (or similar) command in block 340. In an embodiment where the JavaScript application is responsible for responding to scrolling events by manipulating the absolute positioning of views (as opposed to relying upon the scrolling functionality of the layout engine), the JavaScript application may further communicate absolute positioning instructions to the layout engine as part of block 340.

In an embodiment, any time the application renders a view, the application also instructs the display component to display a view. For example, the rendering may imply to the display component that the view is to be displayed, or the application may simply be configured to always instruct the display of a rendered view. In such embodiments, the display component may buffer certain views offscreen until the user moves the viewable window.

At block 350, while displaying the first set of views in the viewable window, the application detects that resource usage at the first device is below a threshold. For example, application may monitor memory and/or processor utilization at the device to see if either or both metrics drop below a certain percentage or other threshold. In an embodiment, the application only monitors its own usage of resources. For example, in the context of a JavaScript application, the application may not be able to access information about memory or processor utilization directly. Instead, the application monitors how many critical operations the application has performed over a recent period of time, or how much time has passed since the last critical operation. For example, a JavaScript application may set a timer to determine if a certain period of time passes without the JavaScript engine invoking a run loop function responsible for performing critical operations. In an embodiment, critical operations may include any operations that immediately affect the viewable window in response to real-time events, such as user operations or server updates to currently displayed views. However, critical operations may include other operations as well. If the number of critical operations invoked over the time period is low enough (or zero, in an embodiment), and/or if the amount of time taken to perform the critical operations is low enough, the application determines that resource usage at the first device is below the threshold.

At block 360, upon detecting that the resource usage is below a threshold, the application selects additional items in the ordered set that are not in the first sequence of items. The application selects these additional items for the purpose of background rendering while resource usage remains below the threshold. This block may be coordinated with block 370 below, in that the application incrementally selects the additional items by repeatedly selecting a single item (or a small set of items) and rendering views for the single item. The application will repeat the incremental selection process as long as resource usage remains below the threshold. Techniques for identifying which items to select are described in subsequent sections.

At block 370, the application renders a second set of views that correspond to the selected additional items. Note that since the viewable window was already filled in block 340 above, each view in the second set of views is outside of the viewable window at the time the second set of views is rendered. That is, barring an event such as that of block 380 below, the application will not instruct the display component to display the rendered second set of views and/or the display component will hold the rendered second set of views in an offscreen buffer rather than display the rendered second set of views in the viewable window. In an embodiment, flow may return from here to block 350 if block 380 is not performed.

At block 380, while each of the views in the second set of views is rendered but not displayed in the viewable window, the application receives input data that requests or indicates a change to the viewable window. For example, the input data may indicate user input in response to which the display component scrolled the viewable window up or down. As another example, the input data may be a user request to the application to scroll or filter the ordered set of items. As yet another example, the input data may be input from a server indicating the removal of an item from the first sequence of items.

At block 390, the application uses at least a particular view from the already rendered second set of views to perform one or more actions in response to the input data. As a result of this step, the display component will display at least a portion of the particular view of the second set of views in a position in the viewable window formerly occupied by at least a portion of a view from the first set of views. The display component will do so without the particular view having been re-rendered between receiving the input data and displaying the portion of the particular view.

For example, in the event of a scrolling operation that scrolls the viewable window one view slot up, the application may instruct the display component to display the particular view in place of the former first view in the viewable sequence. The application may also move the former first view downwards in the viewable sequence to replace the former second view, and so forth. The former last view of the sequence will no longer appear in the viewable window. As another example, if the scrolling operation had shifted the viewable window less than a full slot, a portion of the particular view would be displayed in place of a portion of the first view, and all other views would be shifted down by a corresponding amount. Other examples of responding to the input data using the background rendered set of views are described in other sections.

In an embodiment, the display component is partially or fully responsible for performance of block 390. For example, in the event that the display component is buffering the rendered views offscreen, the display component responds to the scrolling operation directly. The application may then receive an indication of the operation(s) performed by the display component and make additional changes, such as optimally adjusting the set of views buffered offscreen, if necessary.

Note that, had the application not detected that resource usage was below the threshold, per block 350, prior to receiving the input data that requests or indicates a change to the viewable window, as described in block 380, a second set of views may not yet have been rendered. In such a case, if the application had not previously rendered an up-to-date view that is to be displayed in the viewable window as a consequence of the input data, the application reverts to rendering the view on the fly. In an embodiment, rendering the view on the fly may result in the application exhibiting some "jerkiness" as it moves the new view into the viewable window.

Flow 300 is but an example embodiment of technique for optimizing operations that involve changes to views in a viewable window. Other embodiments may include more or fewer steps, in potentially different orders. Various modifications, extensions, and specific details are discussed blow.

4.1. Selecting the Additional Items to Background Render

The processing of views during a background rendering cycle may include rendering new views, evaluating whether an already rendered view needs to be re-rendered, and/or evaluating whether a view needs to be moved in a priority queue. In an embodiment, the background rendering cycle processes views for as many additional items as possible while resource utilization remains below a threshold. In an embodiment, the number of views processed may be constrained by a background rendering limit that is based on the view pool size limit. In an embodiment, the application performs the background rendering process for only a predetermined period of time (e.g. until the next runloop cycle is invoked). In an embodiment, the application processes only a fixed number of views during a background rendering process, or even just a single view.

In an embodiment, the items selected for processing during a background rendering cycle are those that the application calculates to be most likely to be displayed in the near future (e.g. in response to the next user input). In an embodiment, the items are selected based on their proximity in the ordered set to the first sequence of items in the ordered set. For example, if the viewable window includes items at indexes 3-6, and views have also been rendered for the items at indexes 2 and 7, then the application may select to render views next for the items at indexes 1 and 8. In an embodiment, the application may weight items in a certain direction more heavily than items in another direction. For example, if the user has recently begun scrolling downwards, the application may background render views for the items at indexes 8 and 9 before rendering views for the item at index 1, based on the assumption that views at indexes 8 and 9 are more likely to be displayed in the near future.

In an embodiment, the items are selected for background rendering by iteratively selecting each item of the additional items in such a manner as to ensure that all items between the first sequence of items in the ordered set and the newly selected item have a corresponding rendered view that is not dirty in the second set of views. In an embodiment, the items are selected for background rendering by iteratively selecting each additional item responsive to determining both that the additional item does not have a corresponding rendered view that is not dirty and that the additional item is in closest proximity to the first sequence of items in the ordered set relative to all other items in the ordered set that do not have a corresponding rendered view that is not dirty.

Figure 4:
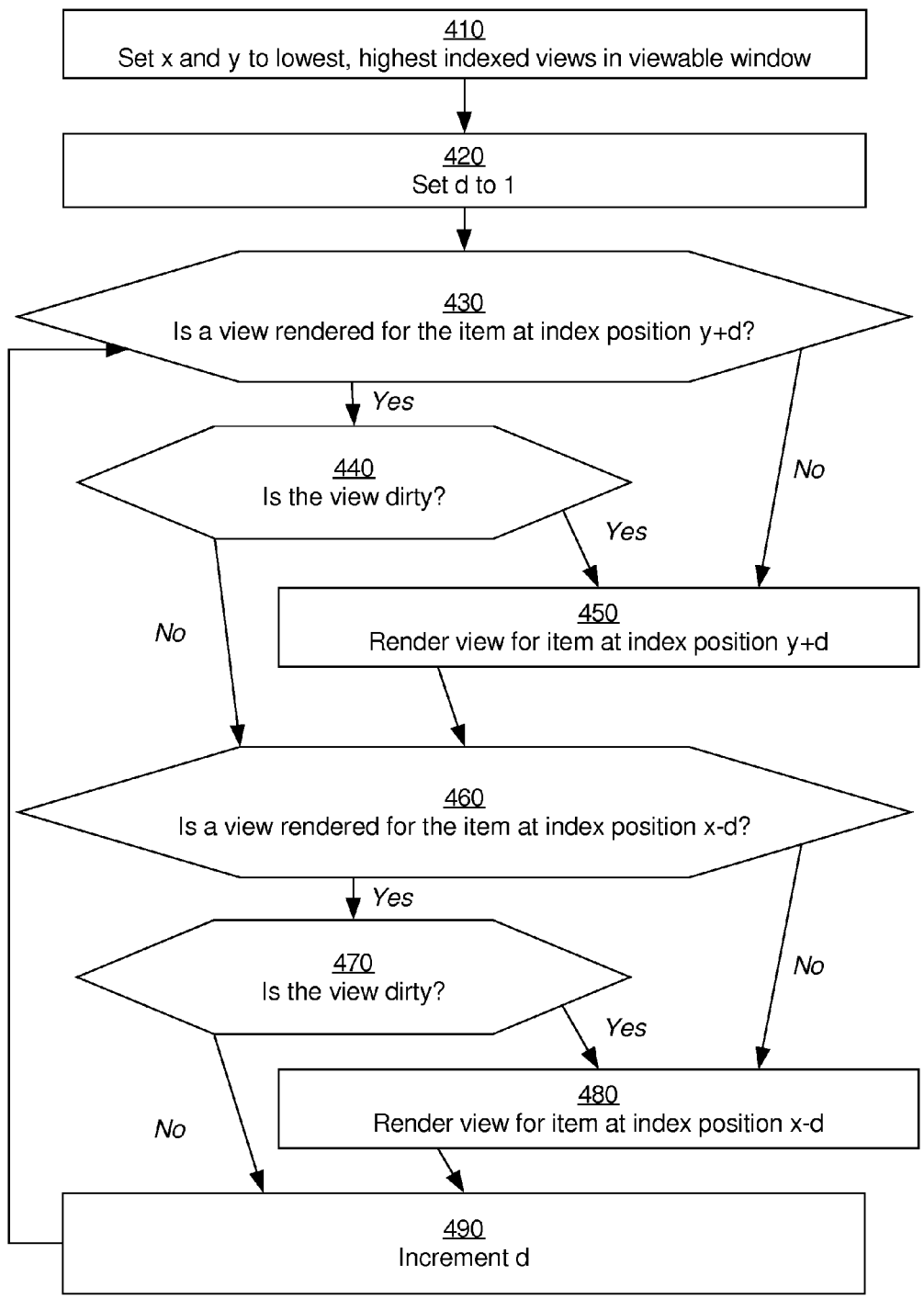
FIG. 4 is a flow diagram illustrating an iterative method for background rendering views that fits the description of both of the previously described embodiments.

For example, FIG. 4 is a flow diagram 400 illustrating an iterative method for background rendering views that fits the description of both of the previously described embodiments. At block 410, the variables x and y are set, respectively, to the lowest index for an item visible in the viewable window, and the highest index for an item visible in the viewable window. At block 420, the variable d, corresponding to the distance from the viewable window, is set to 1. At block 430, the application determines if there is a view already rendered for the item at index position y+d. If so, then at block 440 the application determines if the view is dirty. If there is no view rendered, or if the view is dirty, flow proceeds to block 450, which involves rendering a new view for the item at index position y+d. Otherwise, block 450 is skipped. At block 460, the application determines if there is a view already rendered for the item at index position x−d. If so, then at block 470 the application determines if the view is dirty. If there is no view rendered, or if the view is dirty, flow proceeds to block 480, which involves rendering a new view for the item at index position x−d. Otherwise, block 480 is skipped. At block 490, d is incremented. Flow then returns to block 430. The flow repeats until it is interrupted by input that changes the viewable window, or until the maximum view pool size, minus the viewable window, has been processed.

Of course, flow diagram 400 is but one example method suitable for selecting additional items to background render. Other flows may contain additional or fewer steps, in potentially different orders. For example, steps 430-450 may be swapped with steps 460-480.

In an embodiment, rendering of the second set of views is paused while the resource usage at the client device is above a threshold. The application resumes rendering of the second set of views when the resource usage is again below the threshold. The application may begin again from the closest item to the viewable window (e.g. return to block 410 of flow 400), and thus resuming rendering would include re-rendering any previously rendered views in the second set of views whose corresponding item in the ordered set has changed (i.e. become dirty) since the previously rendered view was rendered. Or, in an embodiment, the application may resume rendering from the last item that was background rendered.

4.2. Resuming Background Rendering after Viewable Window Moves

In an embodiment, after an operation moves the viewable window (i.e. changes which views are in the viewable window), a new set of views will be visible in the viewable window. The new set of views corresponds to a new sequence of consecutive items in the ordered set. That is, if the user had been viewing the sequence of items 3-7, and had then scrolled down three spots, the viewer will now be viewing items 7-10.

After performance of such an operation, the application may background render a new second set of views that correspond to new additional items, in the ordered set, that are not in the new sequence of items. In so doing, the application may re-use at least a subset of the former second set of views. For example, if views for items 8-11 had previously been background rendered, the application may reuse the view for item 11 rather than re-render the view for item 11 in the background. Barring constraints on the view pool size, the application may further re-use views for any now-hidden items that were previously in the viewable window. That is, the application would re-use the views for items 3-6 rather than re-render views 3-6 in the background. The application would only render new views for particular items of the new additional items for which no view that is not dirty exists.

Flow 400 of FIG. 4, discussed above, is an example of a technique that facilitates the re-use of previously rendered views. Whenever the viewable window changes, the application may calculate the new viewable window position per block 410. Assuming that the previously rendered views have not been marked dirty or erased due to view pool size constraints, the algorithm of flow 400 ensures that the previously rendered views are re-used rather than re-rendered.

4.3. Dealing with View Pool Size Constraints

In an embodiment, the total number of views rendered at any given time may be limited by a maximum view pool size. When the maximum view pool size is reached, the application will need to delete (or overwrite) an already rendered view prior to rendering a new view. In an embodiment, the application selects the view to delete or overwrite based on priority data, so that a lowest priority view is always deleted. An example prioritization technique is described in other sections.

In an embodiment, background rendering continues even when the maximum view pool size is reached to ensure that the view pool includes views that are most likely to be displayed in the near future. That is, even if the maximum number of views has been rendered, the background cycle may iteratively evaluate certain items in a collection to determine whether the view pool should be modified to include a view for the item.

Various techniques may be utilized to this end. For example, a number n of lowest priority views may be immediately deleted in response to a scrolling operation, the number n corresponding to amount of slots scrolled through, minus half the maximum view pool size. The view pool may then be repopulated to include new views that are now closest to the viewable window.

As another example, the application may utilize a flow such as flow 400 to optimally maintain the view pool. When the maximum view pool size has been reached, the application may be configured to identify the lowest priority view any time block 450 or 480 is performed. The lowest priority view is then deleted or overwritten. However, if the currently evaluated view would have a lower priority than the lowest priority view, and the maximum view pool size has already been reached, then the background rendering cycle immediately terminates.

4.4. Optimizing Operations by Overwriting Views

As explained above, it is in some embodiments faster to overwrite a view rather than delete a view and instantiate a new view. The application thus overwrites a rendered view by deleting all rendered information that is unique to an old item within a container, such as a containing HTML element, and replacing it with new rendered information specific to a new item. The application then modifies the ordering data to indicate that the view corresponds to a new index associated with the new item. For example, with certain JavaScript engines and/or DOMs, it is faster to change the value of the innerHTML for an already rendered <div> (or similar) element and move that element to a different position than it is to create a new <div> element using the createElement command.

Optimizing background rendering through overwriting may be accomplished by simply rewriting lowest priority views once the maximum view pool size has been reached instead of deleting lowest priority views and instantiating new ones. Depending on the context, it may also be more efficient to overwrite already-rendered views that have a lower priority than will a view that is being newly rendered, even if the maximum view pool size has not already been reached. For example, when a new view needs to be rendered for immediately displaying in the viewable window (e.g. if the user scrolls to a view that is not yet rendered), the application may provide a smoother user experience by selecting a low priority view to overwrite and move to the new view position instead of instantiating a new view at the position.

In an embodiment, the application may even be configured with a preference to overwrite any lower priority views that may exist when background rendering rather than instantiate new views. In such an embodiment, new views are only instantiated if they will be lower in priority relative to the current viewable window than any already-rendered view.

FIG. 5 is a flow diagram 500 illustrating a method that employs view overwriting, according to an embodiment. Flow 500 is but one example of such a method. At block 510, an application identifies an item to process. For example, the application may be responding to user input that has just scrolled the item into view, or the application may be background rendering views. At block 520, the application determines if a rendered view already exists for the item. If so, then at block 530, the application determines if the rendered view is dirty. If a rendered view exists and the view is not dirty, then processing of the item proceeds to block 570. If a rendered view exists and the view is dirty, then the view is re-rendered at block 535. The dirty view may be overwritten, since it is no longer useable. Flow then proceeds to block 570.

If no rendered view exists in block 520, then at block 540 the application determines if another rendered view exists for an item that has a lower priority than the item being processed. For example, if the item is being processed as part of a scrolling or filtering operation, the application determines if there are any already existing views that are not being displayed. This will be true in many cases, since an old view will be scrolled out as the new view is scrolled in. As another example, if the item is being processed during a background rendering operation, the application determines if there are any rendered views that are not as close to the viewable window as the item currently being processed (e.g. views that are no longer close to the viewable window as a result of the viewable window changing).

If no such rendered view exists, then at block 550 the application instantiates a new view object and renders a view for the new item therein. However, if a lower priority view does exist, then at block 560 the application overwrites the lowest priority view with a rendered view for the processed item. In either case, at block 570, the rendered view for the item being processed is associated with the index of the item being processed, if necessary. This may occur even for existing views, since, as a result of a filtering or sorting operation, the item may have been at a different index the last time the item was processed. At block 580, if applicable, the application instructs the display component to display the view.

4.5. Priority Queue

In an embodiment, an application may calculate and/or maintain priority data indicating lowest priority rendered views for the purpose of deletion or overwriting. The application may utilize any of a variety of techniques for calculating and/or maintaining the priority data. For example, each time the application needs to identify a lowest priority view, it may calculate the distance of each view from the viewable window, for instance, in terms of index positions and/or absolute positioning within the displayed arrangement of views. The application assigns lower priorities to views with higher distances. If a view is no longer associated with any position in the ordered set, as may happen if the ordered set is filtered, the view is always considered to have a lowest priority. In an embodiment, the application may cache the distance, once calculated in data associated with the view. However, since the distance will change when the viewable window changes, the application will need to erase and recalculate the distances when the viewable window changes.

In an embodiment, the application may utilize a doubly linked list as priority data for more quickly identifying the lowest priority view. Each node of the doubly linked list is associated with a rendered view that is not currently displayed. By careful management of the doubly linked list during a background rendering cycle, such as depicted in FIG. 4, the application can ensure that the element at the head of the list will almost always be the least likely rendered view to be displayed in the near future. Thus, the view at the head of the linked list has the lowest priority.

When a previously undisplayed but rendered view scrolls or otherwise moves into the viewable window, it is removed from wherever it is in the linked list. When a view scrolls or is otherwise moved out of viewable window, it is pushed onto the back of the queue. When a background rendering cycle begins, the first view to be processed (whether or not the view is already rendered) goes to the back of the queue as usual. But, after that any following views that are processed in the same cycle are placed in front of the last view. Any view that has already been rendered, when encountered by the background rendering task, is removed from wherever the view was in the list and inserted where the view would have been if the view were to have been freshly rendered. Thus, when a cycle is completed, the last elements rendered (i.e. the farthest from the current viewable window) are at the front of the queue, and will be the first to be reused when needed.

4.6. Item Updating

In an embodiment, each item includes code that executes one or more autonomous update functions. The update functions may be triggered independently of the update functions belonging to other items. An item's update function may be triggered, for example, by updates to the item from a server. To ensure that the application does not waste processing time during critical operations executing update functions for items that are not visible, each item is configured to determine whether a view is currently rendered for the item in the viewable window prior to executing the code.

Each item may be configured, for example, to check with a gatekeeping object, such as an object corresponding to collection 130, prior to executing its update functions. If the view for the item is currently visible, the view is allowed to perform its update function immediately. If the view is not visible, the view is simply marked as dirty and forced to wait. There are two ways a "dirty" item will be allowed to update. First, the item will be allowed to update if its view is moved into the viewable window. Second, the item will be allowed to update if the background render task processes the item. This minimizes the impact of the updating on the user experience, because the update will only be performed if the user actually needs the update or when the user experience will be minimally affected.

5.0. Implementation Examples

5.1. Example Scrolling Operation

Figure 6B:
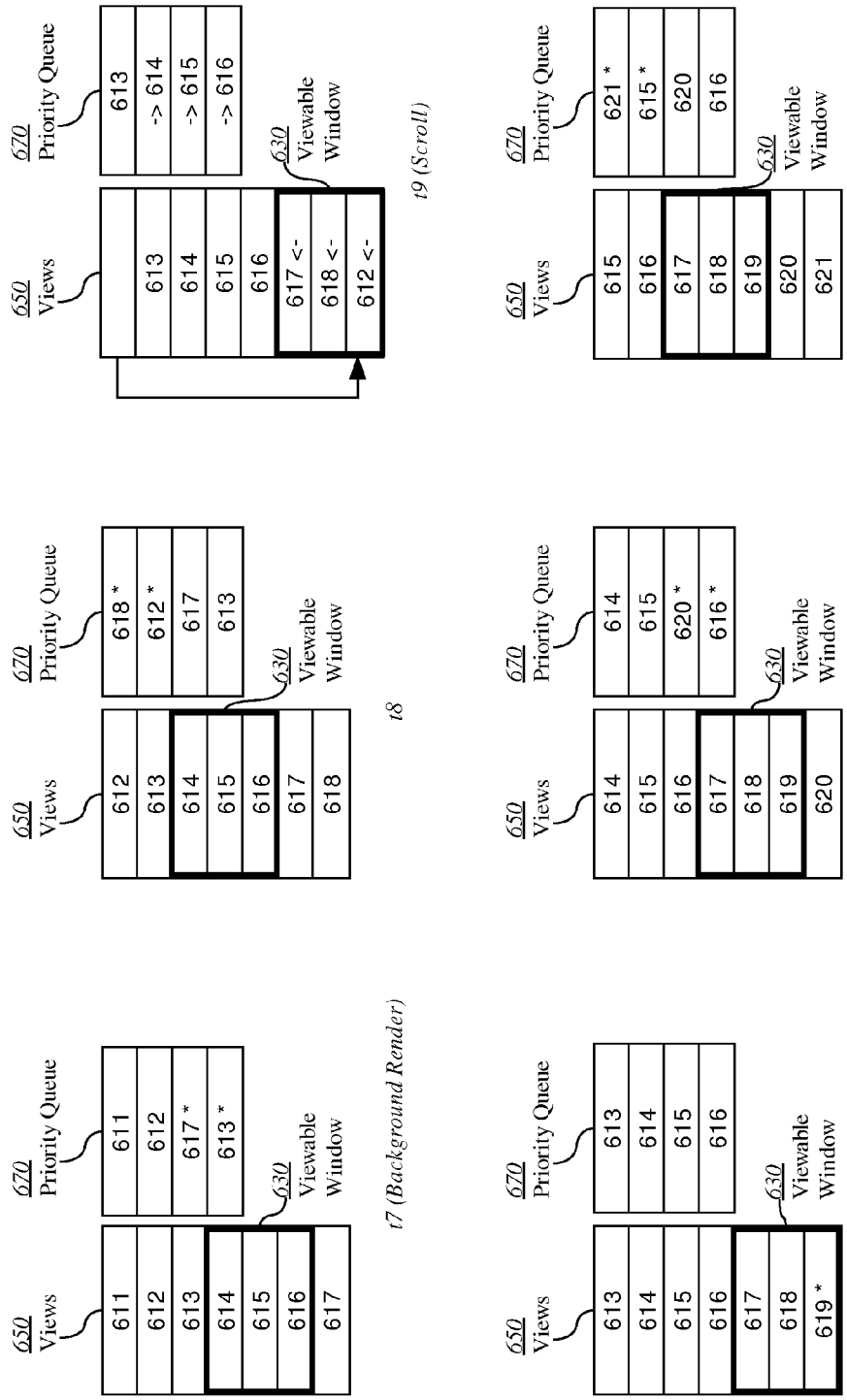

FIG. 6A and FIG. 6B are time graphs illustrating changes to a view pool 650 and priority queue 670 with respect to a viewable window 630 over time in response to scrolling operations, according to an embodiment. As depicted in FIG. 6, the views in view pool 650 are ordered numerically.

At t1, an application such as application 120 maintains rendered views 613-615 in view pool 650. Rendered views 613-615 are visible in viewable window 630.

At t2, a background rendering cycle begins. The application selects to render a view 612 because view 612 is one of two views closest in distance to the viewable window 630. In this case, the application was configured, in the event of a tie in distance, to select the view upwards from the viewable window 630, but other tie-breaking mechanisms are possible. Since view 612 is not in the viewable window 630, the rendered view 612 is also placed in the priority queue 670. Priority queue 670 is a doubly linked list, but currently consists only of view 612. Had there been other views already in priority queue 670, view 612 would have been inserted at the back of the priority queue because it was the first view processed during the background rendering cycle.

At t3, the background rendering cycle continues. This time, the application selects to render a view 616 because view 616 is the closest view in distance to the viewable window 630. Since view 616 is not in the viewable window 630, the rendered view 616 is also placed in the priority queue 670. Since view 616 is not the first view processed during the background rendering cycle, view 616 is added immediately in front of the previously processed view.

At t4, the background rendering cycle continues. This time, the application selects to render a view 611 because view 611 is one of two views closest in distance to the viewable window 630 that have not yet been processed during the background render cycle. Since view 611 is not in the viewable window 630, the rendered view 611 is also placed in the priority queue 670. Since view 611 is not the first view processed during the background rendering cycle, view 611 is added immediately in front of the previously processed view.

At t5, the background rendering cycle continues. This time, the application selects to render a view 617 because view 617 is the closest view in distance to the viewable window 630 that has not yet been processed during the background render cycle. Since view 617 is not in the viewable window 630, the rendered view 617 is also placed in the priority queue 670. Since view 617 is not the first view processed during the background rendering cycle, view 617 is added immediately in front of the previously processed view.

View pool 650 is limited in size to seven views. The background rendering cycle is therefore limited to four views, which is the view pool limit of seven minus the viewable window size of three. Accordingly, the background rendering cycle ends after t5.

At t6, the application receives input requesting to scroll down one slot. The viewable window 630 is moved so that views 614-616 are now visible. Since view 616 was already rendered at t3, and has not been marked dirty, the application simply causes the already rendered view 616 to be displayed. View 616 is removed from priority queue 670, and view 612 is therefore linked to view 611 to fill in the gap. Since view 613 was scrolled out of the viewable window 630, view 613 is added to the back of the priority queue.

At t7, the scrolling operation has ended and the application begins a new background rendering cycle. The background cycle begins by processing the closest view 613. View 613 has already been rendered and does not need to be rendered again unless view 613 has been marked dirty. Since view 613 is the first view being processed, view 613 should be at the back of the queue. Thus, view 613 does not need to be moved. View 617 is processed next. View 617 also does not need to be re-rendered. However, view 617 is moved immediately in front of the last processed view in the priority queue, in this case view 613.

At t8, the background rendering cycle continues with view 612. View 612 does not need to be re-rendered. Since view 617 was the last processed view, view 612 also does not need to be moved. View 618 is then processed. View 618 has not yet been rendered. Nor is there room to add view 618 to the view pool. Based on the priority queue, then, the application determines to remove view 611 to make way for view 618. View 618 is then rendered. In an embodiment, view 618 overwrites view 611. In an embodiment, view 611 is deallocated, and view 618 is instantiated. View 618 is then placed in the priority queue immediately in front of the last processed view, in this case 612. At this point, the background rendering cycle has processed the maximum number of views and therefore terminates.

At t9, the application receives a request to scroll three spots. Consequently, view 614, view 615, and view 616 are, in that order, moved to the back of the priority queue. Since the application has already rendered view 617 and view 618, the application simply displays these rendered views in viewable window 630, without having to re-render the views. View 617 and view 618 are also moved out of priority queue 670. However, the application has not rendered view 619. The application therefore identifies the lowest priority rendered view still remaining in the priority queue, which in this case was view 612. The application determines that view 612 should therefore be replaced by view 619. The application could accomplish this replacement by simply deallocating view 612 and instantiating view 619. However, in the depicted embodiment, the application moves view 612 into the position that view 619 should be placed.

At t10, the application overwrites view 612 with a rendered view 619, thereby completing the replacement of view 612 with view 619. Note that the overwriting could instead have occurred prior to moving view 612.

At t11, a new background rendering cycle begins. Already rendered view 616 is processed and placed at the back of queue 670, which in this case does not result in any movement of view 616. View 620 is newly rendered and placed in front of view 620.

At t12, the background rendering cycle completes with view 615 being processed and placed immediately in front of view 620, followed by view 621 being newly rendered and placed immediately in front of view 615.

FIG. 6 illustrates but one embodiment of the techniques described herein. Other embodiments may differ in any of a variety of aspects. For example, other embodiments may use different viewable window sizes, different maximum view pool sizes, and different prioritization schemes.

5.2. Example Filtering Operation

Figure 7:
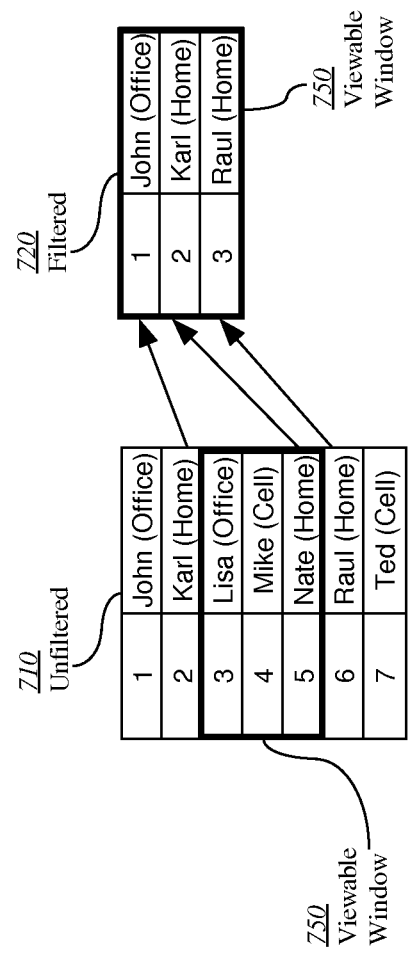
FIG. 7 illustrates the state of a view pool before and after a filtering operation.

FIG. 7 illustrates the state of a view pool before and after a filtering operation, according to an embodiment. In this case, the filtering operation filters an alphabetically ordered set of views corresponding to contact items by the value of category associated with the contact items. Specifically, the filtering operation filters the ordered set to display only contacts who are in the "Home" category.

Unfiltered view pool 710 includes seven views, indexed at positions 1-7. The views at positions 3 and 5 are viewable in viewable window 750. This results in a set of three items, corresponding to index positions 1-3. Rather than delete all of the views and re-render them, the application detects that there are already views for "John," "Karl" and "Raul." The application may make this determination, for example, based on a global item identifier that is associated with each of the rendered views. The application thus moves the still relevant views to new index positions and displays them without re-rendering.

5.3. Alternative Priority Queue

Though the priority queue and background rendering process described herein addresses only views that are not in the viewable window, the techniques described herein are also applicable to priority queues and background rendering processes that also include views within the viewable window. For example, rather than start the background rendering process and building of the priority queue with a first view outside of the viewable window, the application may begin with a middle view in the viewable window.

6.0. Implementation Mechanism—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
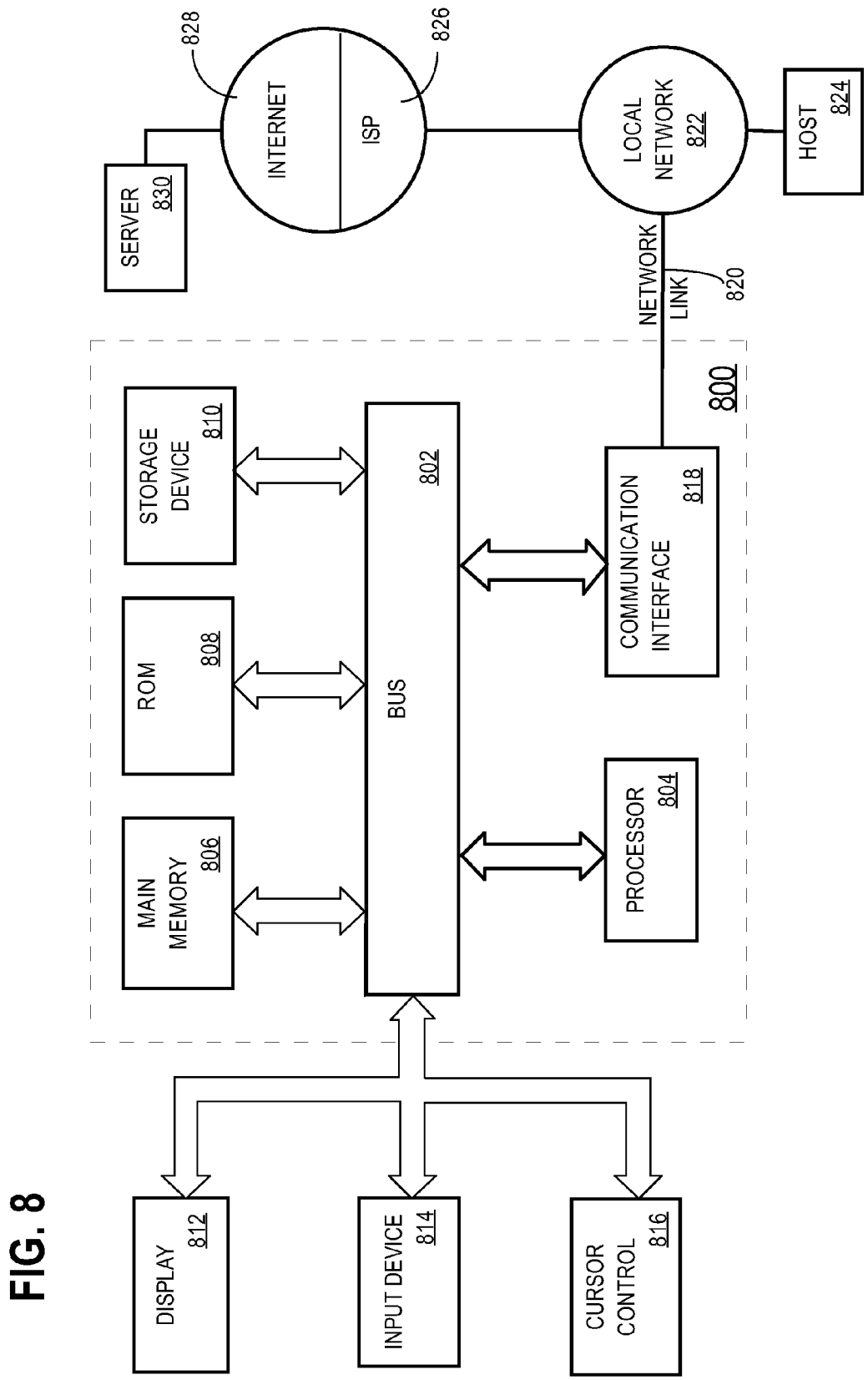
FIG. 8 is block diagram of a computer system upon which embodiments may be implemented.

For example, FIG. 8 is a block diagram that illustrates a computer system 800. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that include bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

7.0. Extensions and Alternatives

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed by one or more computing devices, the method comprising:
   maintaining a set of unrendered items;
   generating a set of rendered items corresponding to a subset of the unrendered items in the set of unrendered items;
   maintaining a first ordering of rendered items in the set of rendered items, the first ordering indicating a display order for the rendered items;
   maintaining a second ordering of rendered items in the set of rendered items, wherein the second ordering is different than the first ordering, wherein the second ordering reflects proximity of each of the rendered items in the second ordering from a viewable window of rendered items;
   utilizing the second ordering to identify a lowest priority rendered item to replace with a newly rendered item as a result of a scrolling operation;
   reusing a container for the lowest priority rendered item by rewriting the container for the lowest priority existing view with a rendered view of the new item and re-ordering the container to reflect the new item; and
   displaying the rendered view of the new item on a display of at least one of the one or more computing devices after receiving input data requesting or indicating a change to the viewable window.

2. The method of claim 1, further comprising rendering the view of the new item upon detecting that resource usage of at least one of the one or more computing devices is below a threshold.

3. The method of claim 2, further comprising:
   pausing rendering of the view of the new item while the resource usage at the at least one of the one or more computing devices is above the threshold;
   resuming rendering of the view of the new item when the resource usage is again below the threshold.

4. The method of claim 3, wherein resuming rendering comprises re-rendering any previously rendered views whose corresponding item in the second ordering has changed since the previously rendered view was rendered.

5. The method of claim 1, wherein displaying the rendered view of the new item occurs without re-rendering the view between receiving the input data and displaying at least a portion of the rendered view.

6. The method of claim 1, wherein the input requesting or indicating the change is a request to scroll, filter, or re-filter, the viewable window.

7. The method of claim 1, wherein the set of rendered items is a set of coded objects representative of contact information or messages.

8. The method of claim 1, wherein generating the set of rendered items comprises making calls to a document object model to generate HTML elements.

9. The method of claim 1, wherein each item comprises code that executes one or more autonomous update functions and each item is configured to determine whether a view is currently rendered for the item in the viewable window prior to executing the code.

10. The method of claim 1, wherein generating the set of rendered items corresponding to the subset of the unrendered items comprises selecting one or more items to render based on proximity of the one or more items to an item in the set of rendered items.

11. One or more non-transitory computer-readable storage media storing instructions that, when executed by one or more computing devices, cause performance of a method comprising:
    maintaining a set of unrendered items;
    generating a set of rendered items corresponding to a subset of the unrendered items in the set of unrendered items;
    maintaining a first ordering of rendered items in the set of rendered items, the first ordering indicating a display order for the rendered items;
    maintaining a second ordering of rendered items in the set of rendered items, wherein the second ordering is different than the first ordering, wherein the second ordering reflects proximity of each of the rendered items in the second ordering from a viewable window of rendered items;
    utilizing the second ordering to identify a lowest priority rendered item to replace with a newly rendered item as a result of a scrolling operation;
    reusing a container for the lowest priority rendered item by rewriting the container for the lowest priority existing view with a rendered view of the new item and re-ordering the container to reflect the new item; and displaying the rendered view of the new item on a display of at least one of the one or more computing devices after receiving input data requesting or indicating a change to the viewable window.

12. The storage media of claim 11, further comprising rendering the view of the new item upon detecting that resource usage of at least one of the one or more computing devices is below a threshold.

13. The storage media of claim 12, further comprising:
pausing rendering of the view of the new item while the resource usage at the at least one of the one or more computing devices is above the threshold;
resuming rendering of the view of the new item when the resource usage is again below the threshold.

14. The storage media of claim 13, wherein resuming rendering comprises re-rendering any previously rendered views whose corresponding item in the second ordering has changed since the previously rendered view was rendered.

15. The storage media of claim 11, wherein displaying the rendered view of the new item occurs without re-rendering the view between receiving the input data and displaying at least a portion of the rendered view.

16. The storage media of claim 11, wherein the input requesting or indicating the change is a request to scroll, filter, or re-filter, the viewable window.

17. The storage media of claim 11 wherein the set of rendered items is a set of coded objects representative of contact information or messages.

18. The storage media of claim 11, wherein generating the set of rendered item comprises making calls to a document object model to generate HTML elements.

19. The storage media of claim 11, wherein each item comprises code that executes one or more autonomous update functions and each item is configured to determine whether a view is currently rendered for the item in the viewable window prior to executing the code.

20. The storage media of claim 11, wherein generating the set of rendered items corresponding to the subset of the unrendered items comprises selecting one or more items to render based on proximity of the one or more items to an item in the set of rendered items.

21. A system comprising: one or more processors coupled to memory storing instructions to cause the one or more processors to perform operations comprising:
maintaining a set of unrendered items;
generating a set of rendered items corresponding to a subset of the unrendered items in the set of unrendered items;
maintaining a first ordering of rendered items in the set of rendered items, the first ordering indicating a display order for the rendered items;
maintaining a second ordering of rendered items in the set of rendered items, wherein the second ordering is different than the first ordering, wherein the second ordering reflects proximity of each of the rendered items in the second ordering from a viewable window of rendered items;
utilizing the second ordering to identify a lowest priority rendered item to replace with a newly rendered item as a result of a scrolling operation;
reusing a container for the lowest priority rendered item by rewriting the container for the lowest priority existing view with a rendered view of the new item and re-ordering the container to reflect the new item; and
displaying the rendered view of the new item on a display of at least one of the one or more computing devices after receiving input data requesting or indicating a change to the viewable window.

22. The system of claim 21, wherein the processor further to perform additional operations comprising rendering the view of the new item upon detecting that resource usage of at least one of the one or more computing devices is below a threshold.

23. The system of claim 22, wherein the processor further to perform additional operations comprising:
pausing rendering of the view of the item while the resource usage at the at least one of the one or more computing devices is above the threshold;
resuming rendering of the view of the new item when the resource usage is again below the threshold.

24. The system of claim 23, wherein the processor further to perform additional operations comprising resuming rendering comprises re-rendering any previously rendered views whose corresponding item in the second ordering has changed since the previously rendered view was rendered.

25. The system of claim 21, wherein the processor further to perform additional operations comprising displaying the rendered view of the new item occurs without re-rendering the view between receiving the input data and displaying at least a portion of the rendered view.

26. The system of claim 21, wherein the input requesting or indicating the change is a request to scroll, filter, or re-filter, the viewable window.

27. The system of claim 21, wherein the set of rendered items is a set of coded objects representative of contact information or messages.

28. The system of claim 21, wherein generating the set of rendered items comprises making calls to a document object model to generate HTML elements.

29. The system of claim 21, wherein each item comprises code that executes one or more autonomous update functions and each item is configured to determine whether a view is currently rendered for the item in the viewable window prior to executing the code.

30. The system of claim 21, wherein generating the set of rendered items corresponding to the subset of the unrendered items comprises selecting one or more items to render based on proximity of the one or more items to an item in the set of rendered items.

* * * * *